United States Patent [19]

Kanoe et al.

[11] Patent Number: 4,792,587

[45] Date of Patent: Dec. 20, 1988

[54] RESIN COMPOSITION WHICH EXHIBITS ANISOTROPISM WHEN MELTED

[75] Inventors: Toshio Kanoe, Fuji; Tsuneyoshi Okada, Kawasaki; Kenji Hijikata, Fuji, all of Japan

[73] Assignee: Polyplastics Co., Ltd., Osaka, Japan

[21] Appl. No.: 26,361

[22] Filed: Mar. 16, 1987

[30] Foreign Application Priority Data

Mar. 24, 1986 [JP] Japan .................................. 61-65456

[51] Int. Cl.⁴ ..................... C08L 67/02; C08L 75/04; C08L 77/10; C08L 77/12; C08L 83/04
[52] U.S. Cl. .................................. 525/131; 525/132; 525/176; 525/179; 525/183; 525/185; 525/188; 525/425; 525/434; 525/437; 525/439; 525/440; 525/444; 525/446; 525/453; 525/464; 525/467; 525/474; 525/534
[58] Field of Search ............... 525/444, 425, 437, 440, 525/446, 439, 467, 453, 464, 434, 534, 474, 132, 131, 179, 176, 183, 188, 185

[56] References Cited

U.S. PATENT DOCUMENTS

| | | | |
|---|---|---|---|
| 3,778,410 | 12/1973 | Kuhfuss | 525/437 |
| 4,161,470 | 7/1979 | Calundann | 528/190 |
| 4,228,218 | 10/1980 | Takayanagi et al. | 525/58 |
| 4,267,289 | 5/1981 | Froix | 525/444 |
| 4,276,397 | 6/1981 | Froix | 525/448 |
| 4,386,174 | 5/1983 | Cogswell | 525/444 |
| 4,408,022 | 10/1983 | Cincotta et al. | 525/444 |
| 4,429,078 | 1/1984 | Cogswell et al. | 525/165 |
| 4,438,236 | 3/1984 | Cogswell et al. | 525/165 |
| 4,451,611 | 5/1984 | Cincotta et al. | 525/51 |
| 4,460,735 | 7/1984 | Froix | 524/537 |
| 4,460,736 | 7/1984 | Froix et al. | 524/539 |
| 4,489,190 | 12/1984 | Froix | 524/539 |
| 4,567,227 | 1/1986 | Kiss | 524/538 |

*Primary Examiner*—Patricia Short
*Attorney, Agent, or Firm*—Robert M. Shaw

[57] ABSTRACT

A resin composition of the invention, exhibiting the anisotropism when melted, comprises (1) a resin having rigid structure and exhibiting the anisotropism when melted and (2) a resin having a rigid structure portion and a soft structure portion, both resins having been uniformly mixed with each other.

20 Claims, No Drawings

RESIN COMPOSITION WHICH EXHIBITS ANISOTROPISM WHEN MELTED

The present invention relates to a resin composition which exhibits anisotropism when melted and has superior processability and mechanical properties.

As plastics have recently found more applications then before, there has arisen a demand for materials having high rigidity, high heat resistance, good chemical resistance, and good processability. One material that satisfies these requirements is the liquid crystal polymer or a polymer which exhibits anisotropism when melted. This idea was proposed by W. J. Jackson in Journal of Polymer Science, Polymer Chemistry Edition, Vol. 14, p. 2043 (1976). Since then, several liquid crystal polymers have been proposed. The typical ones are disclosed in, for example, Japanese Patent Laid-open Nos. 72393/1974, 43223/1975, and 56594/1979.

The polymer which exhibits anisotropism when melted orients very easily and forms fibrils easily on account of its rigid skeleton. In addition, it is not easily made into film and three-dimensional moldings because of its anisotropism in mechanical strength.

The filling of the polymer with reinforcements for the improvement of mechanical strength is a technique well known among those who are skilled in the art. However, there are may instances where the reinforcement is achieved at a sacrifice of resin's desirable properties such as light weight, chemical resistance, and moldability.

The present inventors carried out extensive studies in search of the means to improve the mechanical strength of the resin without deteriorating the resin's superior properties and to alleviate the shortcomings resulting from high orientation, paying their attention to the fact that a rigid polymer forms the high-order structure by the aid of the minimum domain which is an aggregate with rigid molecules arranged in one direction and that the mechanical defect of the rigid polymer occurs along the boundary of the minimum domain. The results of the studies led to the present invention.

Accordingly, it is an object of the present invention to provide a resin composition which exhibits anisotropism when melted, said composition comprises two components uniformly mixed with each other, the first component being a resin which has a rigid skeleton and exhibits anisotropism when melted, and the second component being a resin which has a rigid skeleton and a flexible skeleton.

The rigid skeleton in the first component is the indispensable structure which permits the resin to exhibits anisotropism when it is melted. The skeleton need not to be so rigid as to completely freeze the movement of the molecular chain; but the rigidity which permits the resin to exhibit the properties of nematic liquid crystal is satisfactory.

The polymer forming the anisotropic molten phase has the properties of causing the polymer's molecular chains to assume the regular parallel arrangement in the molten state. The state of such arrangement of molecules is referred to as the liquid crystal state or the nematic phase of a liquid crystal. The polymer like this is usually produced from a monomer which has a thin, long, and flat configuration, has a high rigidity along the long axis of the molecule, and has a plurality of chain extension linkages which are coaxial or parallel with one another.

Detailed information about this will be found in Advances in Polymer Science, Vol. 59, p. 104 (1984) by R. W. Lenz et al.

The properties of the anisotropic molten phase can be confirmed by the ordinary polarization test using crossed nicols. To be more specific, the anisotropic molten phase can be confirmed with a Leitz polarizing microscope of 40 magnifications by observing a sample placed on a Leitz hot stage in a nitrogen atmosphere. The above-mentioned polymer is optically anisotropic. Namely, it transmits light when it is placed between the crossed nicols. If the sample is optically anisotropic, it transmits polarized light even when it stands still.

It is not necessary for the second component to contain the rigid skeleton enough to cause the entire resin to exhibit anisotropism in the molten state; but it is desirable that the second component per se exhibit anisotropism when melted, if the second component is to be uniformly mixed with the first component. The starting materials constituting the rigid skeleton of the first and second components may be different from each other; however, at least one of them should preferably be a compound in common with the first and second components, if the uniform mixing is to be achieved as mentioned above.

The segment constituting the rigid skeleton of the resin is composed of one or more kinds selected from polyester, polyesteramide, polyamide, polyazomethine, polyurethane, polysiloxane, and polyphosphazene. The segment per se exhibits the properties of liquid crystal. It should preferably be selected from polyester, polyesteramide, and polyamide, particularly aromatic polyester and aromatic polyesteramide. Following are the preferred examples of the compound which is the starting material constituting the segment. Naphthalene compounds such as 2,6-naphthalenedicarboxylic acid, 2,6-dihydroxynaphthalene, 1,4-dihydroxynaphthalene, and 6-hydroxy-2-naphthoic acid; biphenyl compounds such as 4,4'-diphenyldicarboxylic acid and 4,4'-dihydroxybiphenyl; a compound represented by Formula I, II, or III below:

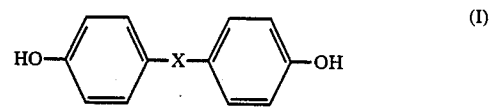

(I)

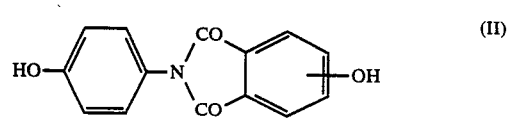

(II)

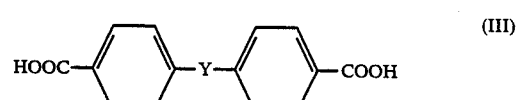

(III)

(where X is a group selected from $C_1$-$C_4$ alkylene, alkylidene, —O—, —SO—, —$SO_2$—, —S—, and —CO—; and Y is a group selected from —$(CH_2)_n$—[n=1–4] and —O$(CH_2)_n$O—[n=1–4]) p-substituted benzene compounds such as p-hydroxybenzoic acid, terephthalic acid, hydroquinone, p-aminophenol, and p-phenylenediamine, and nucleus-substituted benzene compounds thereof (with the substituent group selected from chlorine, bromine, methyl, phenyl, and 1-phenylethyl); m-substituted benzene compounds such as isophthalic acid and resorcinol; and derivatives thereof capable of forming polyester or polyesteramide.

Other preferred examples of the above-mentioned constituents are those which contain as essential constituents one or more kinds selected from naphthalene compounds, biphenyl compounds, and p-substituted benzene compounds. Particularly preferred examples of the p-substituted benzene compounds include p-hydroxybenzoic acid, methylhydroquinone, and 1-phenylethylhydroquinone.

The constituents may be combined as illustrated below.

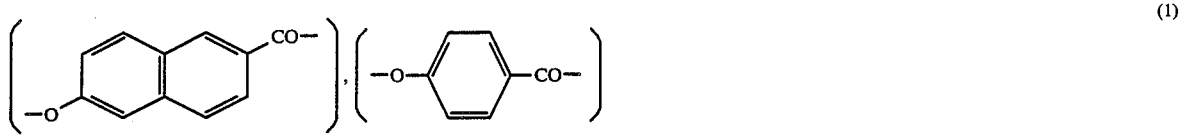

(1)

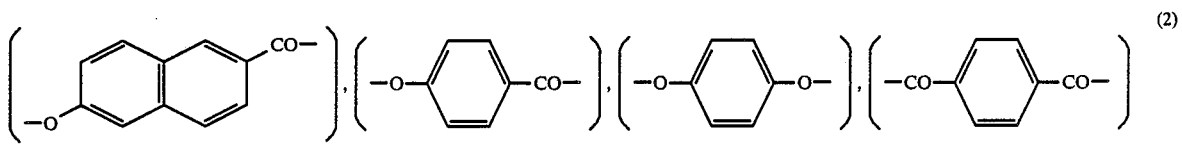

(2)

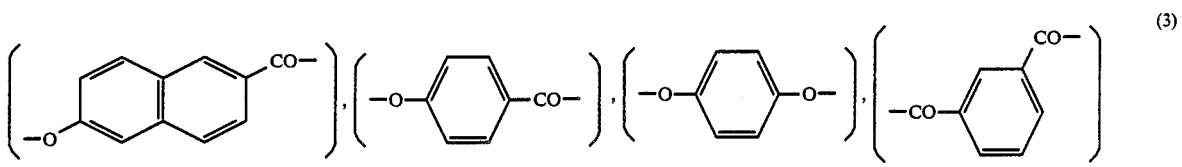

(3)

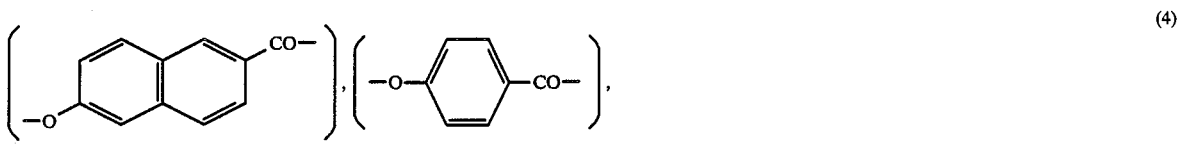

(4)

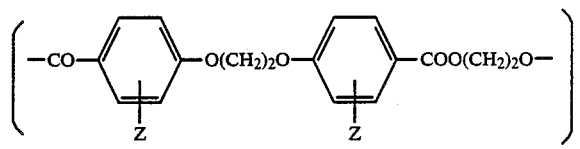

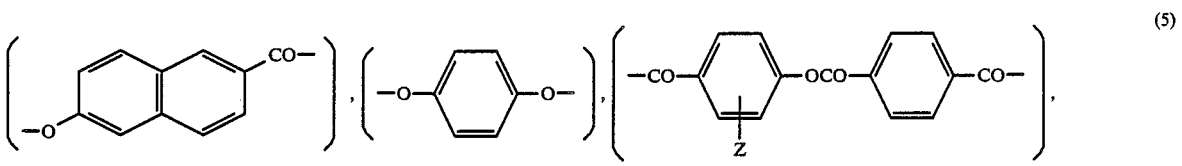

(5)

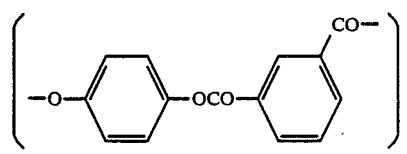

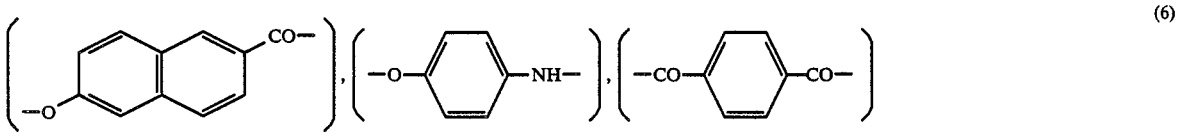

(6)

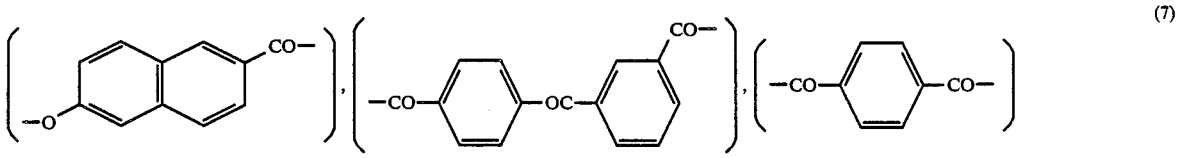

(7)

-continued
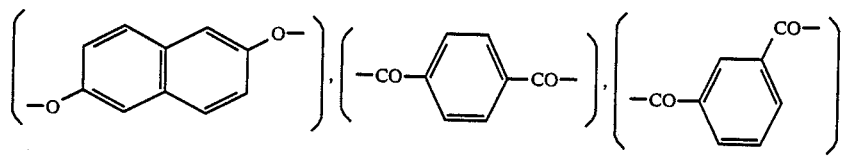 (8)
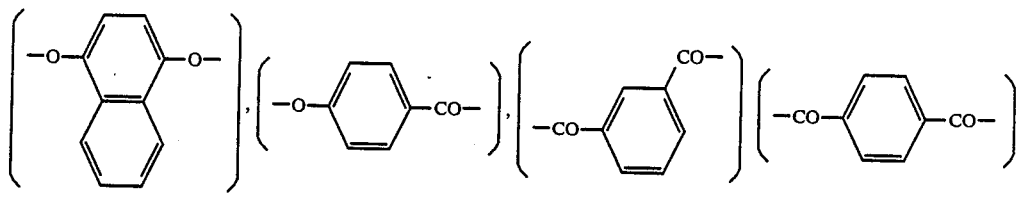 (9)
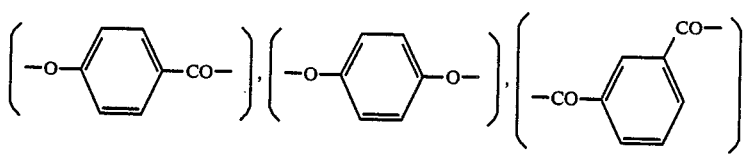 (10)
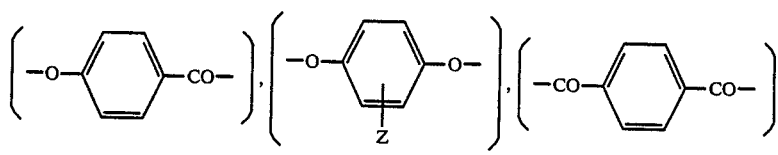 (11)
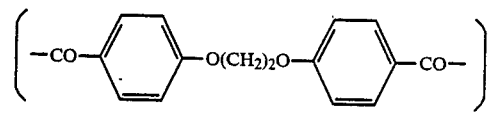
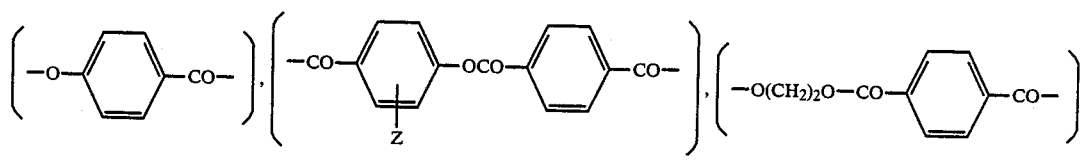 (12)
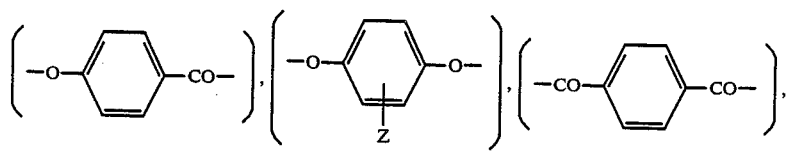 (13)
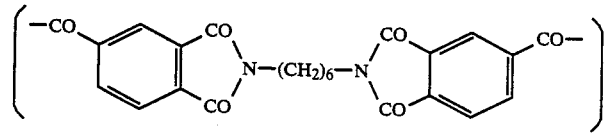
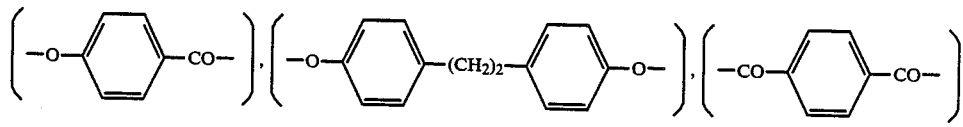 (14)
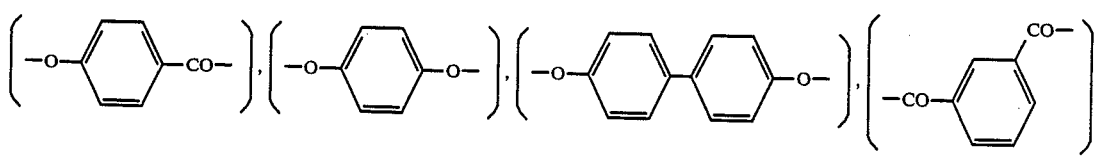 (15)

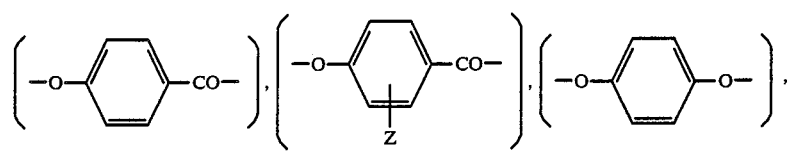
(16)
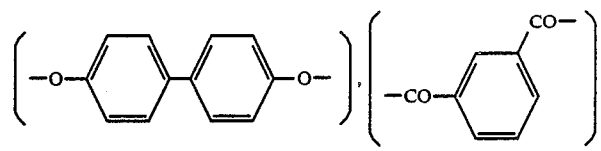
(17)
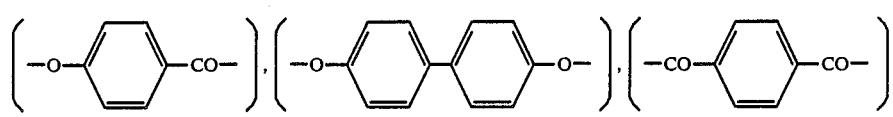
(18)
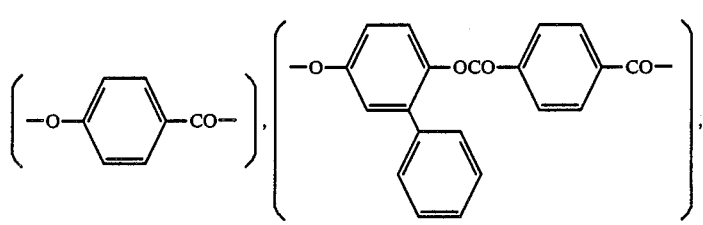
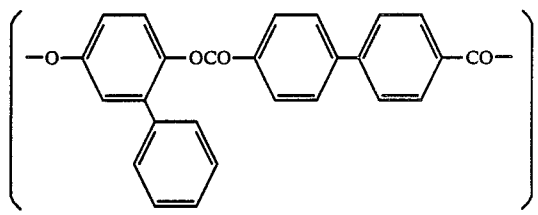
(19)
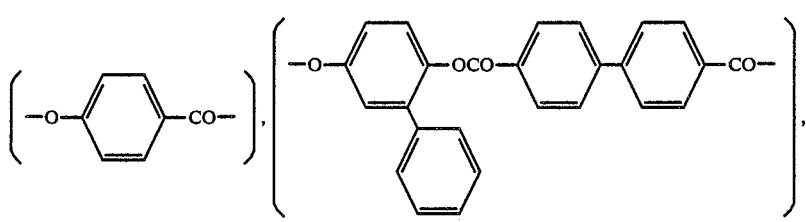
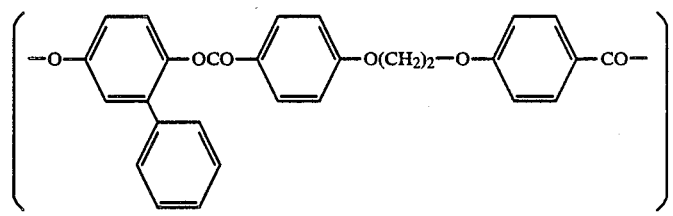
(20)
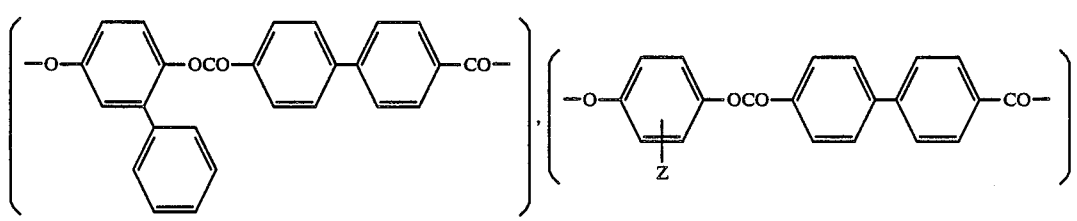

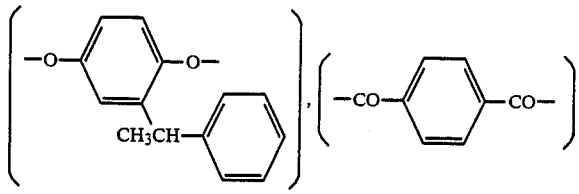
(21)

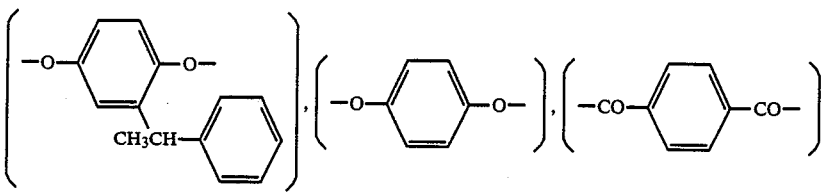
(22)

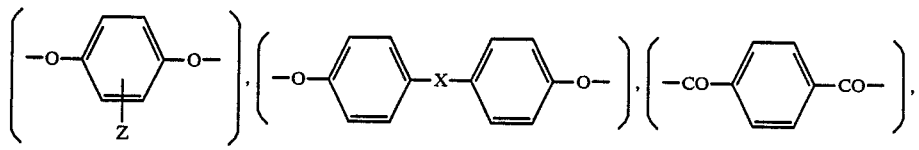
(23)

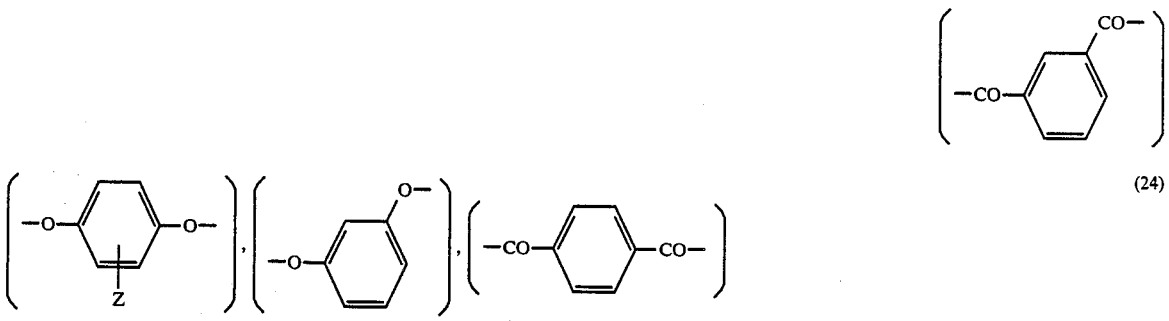
(24)

In the above formulas, Z is a substituent group selected from —Cl, —Br, and —CH$_3$, and X is a substituent group selected from C$_1$-C$_4$ alkylene, alkylidene, —O—, —SO—, —SO$_2$—, —S—, and —CO—.

The second component of the composition of this invention contains a segment constituting the rigid skeleton. This segment is the same one as mentioned above. The preferred one is constructed of hydroxybenzoic acid residue, naphthalene residue, biphenyl residue, and substituted derivatives thereof. The more preferred one is constructed of hydroxybenzoic acid residue and/or naphthalene residue. The naphthalene residue should preferably be hydroxynaphthoic acid residue, particularly 2-hydroxy-6-naphthoic acid. The thus selected compound may be combined with a variety of compounds used in the examples illustrated above for the resin which exhibits anisotropism in the molten state. The preferred combination is the one of hydroxybenzoic acid with hydroxynaphthoic acid and the one of hydroxynaphthoic acid and aminophenol.

The moiety which constitutes the flexible skeleton of the second component has molecular chains which can be freely rotated and bent, and it does not exhibit anisotropism but exhibits crystalline and/or non-crystalline properties when it is melted.

The segment constituting the flexible skeleton of the second component is selected from aromatic polyesters called polyarylate (constructed of bisphenol, terephthalic acid, and isophthalic acid), polyalkylene terephthalate, polycarbonate, polyether sulfone, and polyacrylate. Preferable among them are polyacrylate and polyalkylene terephthalate. Preferred polyalkylene terephthalate is one in which the alkyl group has 2 to 5 carbon atoms.

The second component used in this invention can be produced by copolymerizing (a) one or more starting materials constituting the rigid skeleton with (b) one or more starting mterials constituting the flexible skeleton. The ratio of (a) to (b) should be 5:95 to 95:5, preferably 80:20 to 40:60.

The resin composition of this invention may contain as a third component a thermoplastic polymer having the flexible skeleton. Preferred examples are those polymers selected from aromatic polyester, polyalkylene terephthalate, polycarbonate, polyether sulfone, and polyacrylate. More preferred examples include aromatic polyester and/or polyalkylene terephthalate. Particularly preferred examples include polyalkylene terephthalate in which the alkylene has 2 to 5 carbon atoms.

The first component of the resin composition of this invention is a resin which has a rigid skeleton and exhibits anisotropism when melted. This resin is preferably a copolyester which exhibits anisotropism in its molten state. This copolyester can be formed by a variety of ester forming processes.

The second component of the resin composition of this invention is a resin which has both a rigid skeleton and a flexible skeleton. This resin is preferably a copolyester, which can be produced in the same ester forming process as used for the above-mentioned copolyester.

Namely, the monomer compound can be reacted by the fused acidolysis in the absence of heat-exchange fluid. According to this process, all the monomers are heated to form a molten solution of reactants. As the reaction proceeds, solid polymer particles begin to suspend in the solution. At the final stage of condensation, a vacuum may be applied to facilitate the removal of volatile by-products (such as acetic acid and water).

Also, the slurry polymerization process may be employed to form the aromatic polyester suitable for the resin composition of this invention. According to this process, solid reaction products are obtained in the form of a suspension in the heat-exchange medium.

In the fused acidolysis process or the slurry polymerization process, whichever may be chosen, the organic monomeric reactive substance for which the aromatic polyester is derived can be used for the reaction in the modified form in which the hydroxyl group of the monomer is esterified (or in the form of a lower acyl ester). The preferred lower acyl group is one which has 2 to 4 carbon atoms. Preferably, an acetate ester of such organic monomeric reactive substance should be used for the reaction. It can also be used for the reaction in the modified form in which the carboxylic acid group is esterified (or in the form of phenolester).

The fused acidolysis process or slurry polymerization process can be carried out by the aid of a catalyst. Examples of the catalyst include dialkyltin oxide (e.g., dibutyltin oxide), diaryltin oxide, titanium dioxide, antimony trioxide, alkoxytitanium silicate, titanium alkoxide, alkali metal and alkaline earth metal salt of carboxylic acid (e.g., zinc acetate), Lewis acid (e.g., $BF_3$), and gaseous acid (e.g., HCl). The catalyst is used in an amount of about 0.001 to 1 wt%, particularly 0.01 to 0.2 wt%, based on the total weight of the monomer.

The aromatic polymers suitable for use in this invention tend to be substantially insoluble in ordinary solvents; therefore, they are not suitable for solution processing. However, they can be processed easily by the ordinary melt processing. The preferred aromatic polymer is one which is slightly soluble in pentafluorophenol.

The aromatic polyester used in this invention should have a weight-average molecular weight of about 1,000 to 200,000, preferably about 2,000 to 50,000, and more preferably about 3,000 to 25,000.

The molecular weight may be measured by gel permeation chromatography or other standard methods which do not involve the formation of polymer solution. According to one of such methods, the molecular weight is measured by determining terminal groups in a compression-molded film sample by infrared spectroscopy. The molecular weight may also be measured by the light-scattering method which employs a solution of the polymer in pentafluorophenol.

The above-mentioned aromatic polyester has an intrinsic viscosity (I.V.) of about 0.5 to 10.0 dl/g when it is dissolved in pentafluorophenol at 60° C. at a concentration of 0.1 wt%.

The first component and the second component may be mixed with each other at any mixing ratio. The preferred mixing ratio is 95:5 to 5:95 wt%. The particularly preferred mixing ratio is 70:30 to 10:90.

The resin composition of this invention may be incorporated with a variety of additives and/or fillers by the known methods for the improvement of mechanical properties.

Examples of the additives include plasticizer, stabilizer (e.g., antioxidant and UV light absorber), antistatic agent, flame retardant, coloring agent (e.g., dye and pigment), blowing agent, cross-linking agent (e.g., divinyl compound, peroxide, and vulcanizing agent), and slip agent (for the improvement of fluidity and mold release).

Examples of the fillers include inorganic fibers (e.g., glass fiber, carbon fiber, metal fiber, ceramics fiber, boron fiber, and asbestos fiber), powders (e.g., calcium carbonate, highly dispersible silica, alumina, aluminum hydroxide, talk powder, mica, glass flake, glass beads, quartz powder, silica sand, metal powder, carbon black, barium sulfate, and calcined gypsum), inorganic compounds (e.g., carbon nitride, alumina, and silicon nitride), and whiskers and metal whiskers.

[Effect of the Invention]

According to the mixing rule, in general, a resin composition formed by mixing different polymers is not superior in mechanical properties to one of the constituent polymers which is comparatively superior to the other. Contrary to this general rule, the uniform mixture of the first and second components in this invention exhibits the synergistic effect. This is a surprise.

The resin composition of this invention has a low melt viscosity, has good moldability, and provides moldings having improved mechanical strength.

The resin composition of this invention will find applications in many fields because of its high strength, heat resistance, and chemical resistance.

[Examples]

The invention is now described with reference to the following examples, which should not be construed as limiting the scope of the invention.

Resins A, B, and C, which each represent the first component, and resins L, M, and N, which each represent the second component, were prepared according to the procedure mentioned later.

EXAMPLE 1

Resin A and Resin L were mixed by means of a twin-screw extruder in the ratios shown in Table 1. The resulting mixture was injection-molded into test pieces. The test pieces were examined for tensile strength and flexural strength according to ASTM D638 and D790, respectively. The results are shown in Table 1.

EXAMPLES 2 TO 5

In the same manner as in Example 1, resins B and C and resins L, M, and N were mixed according to the combination as shown in Table 1. The resulting mixtures were made into test pieces for the measurement of tensile strength and flexural strength. The results are shown in Table 1.

COMPARATIVE EXAMPLES 1 TO 6

Resin A, B, and C and resins L, M, and N were individually made into test pieces by extraction and injection molding and the test pieces were examined for physical properties in the same manner as in Example 1. The results are shown in Table 1.

COMPARATIVE EXAMPLES 7 AND 8

Resin B was mixed with polybutylene terephthalate #2000 (made by Polyplastic Co., Ltd.) (represented by symbol "O"), and the resulting mixtures were examined for physical properties in the same manner as in Example 1. The results are shown in Table 1.

COMPARATIVE EXAMPLES 9 AND 10

Resin B was mixed with polyacrylate U-100 (made by Unitika Ltd.), (represented by symbol "P"), and the resulting mixtures were examined for physical properties in the same manner as in Example 1. The results are shown in Table 1.

EXAMPLE 6

Resin B, resin N, and the above-mentioned polybutylene terephthalate were mixed, and the resulting mixtures were examined for physical properties in the same manner as in Example 1. The results are shown in Table 1.

TABLE 1

|  | Resin composition (parts by weight) | Tensile strength (kg/cm$^2$) | Flexural strength (kg/cm$^2$) | Flexural modulus (kg/cm$^2$) |
|---|---|---|---|---|
| Compar. Example 1 | A (100) | 2250 | 1530 | $9.0 \times 10^4$ |
| Example 1 | | | | |
| a | A (70) L (30) | 2460 | 1710 | $9.7 \times 10^4$ |
| b | A (50) L (50) | 2440 | 1700 | $9.7 \times 10^4$ |
| c | A (30) L (70) | 2290 | 1580 | $9.0 \times 10^4$ |
| Compar. Example 4 | L (100) | 1210 | 1140 | $4.5 \times 10^4$ |
| Compar. Example 2 | B (100) | 2100 | 1550 | $9.0 \times 10^4$ |
| Example 2 | | | | |
| a | B (70) L (30) | 2420 | 1710 | $9.8 \times 10^4$ |
| b | B (50) L (50) | 2400 | 1710 | $9.6 \times 10^4$ |
| c | B (30) L (70) | 2370 | 1690 | $8.9 \times 10^4$ |
| Compar. Example 4 | L (100) | 1210 | 1140 | $4.5 \times 10^4$ |
| Compar. Example 2 | B (100) | 2100 | 1550 | $9.0 \times 10^4$ |
| Example 3 | | | | |
| a | B (70) M (30) | 2560 | 1810 | $10.0 \times 10^4$ |
| b | B (50) M (50) | 2350 | 1760 | $9.9 \times 10^4$ |
| c | B (30) M (70) | 2220 | 1650 | $9.1 \times 10^4$ |
| Compar. Example 5 | M (100) | 1260 | 1290 | $5.2 \times 10^4$ |
| Compar. Example 2 | B (100) | 2100 | 1550 | $9.0 \times 10^4$ |
| Example 4 | | | | |
| a | B (70) N (30) | 2300 | 1680 | $9.4 \times 10^4$ |
| b | B (50) N (50) | 2240 | 1620 | $9.2 \times 10^4$ |
| c | B (30) N (70) | 2170 | 1580 | $9.8 \times 10^4$ |
| Compar. Example 6 | N (100) | 920 | 940 | $4.1 \times 10^4$ |
| Compar. Example 3 | C (100) | 1820 | 2590 | $16.0 \times 10^4$ |
| Example 4 | | | | |
| a | C (70) L (30) | 2130 | 3000 | $18.2 \times 10^4$ |
| b | C (50) L (50) | 2200 | 3100 | $18.2 \times 10^4$ |
| c | C (30) L (70) | 1980 | 2610 | $10.4 \times 10^4$ |
| Compar. Example 4 | L (100) | 1210 | 1140 | $4.5 \times 10^4$ |
| Compar. Example 2 | B (100) | 2100 | 1550 | $9.0 \times 10^4$ |
| Compar. Example 7 | | | | |
| a | B (70) O (30) | 1750 | 1210 | $5.0 \times 10^4$ |
| b | B (30) O (70) | 530 | 870 | $2.5 \times 10^4$ |
| Compar. Example 8 | O (100) | 540 | 870 | $2.6 \times 10^4$ |
| Compar. Example 2 | B (100) | 2100 | 1550 | $9.0 \times 10^4$ |
| Compar. Example 9 | | | | |
| a | B (70) P (30) | 1810 | 1360 | $6.3 \times 10^4$ |
| b | B (30) P (70) | 730 | 920 | $2.6 \times 10^4$ |
| Compar. Example 10 | P (100) | 710 | 810 | $1.9 \times 10^4$ |
| Example 6 | B(40) O(30) N(30) | 2190 | 1600 | $9.1 \times 10^4$ |
| Example 7 | B(40) P(30) L(30) | 2350 | 1710 | $9.5 \times 10^4$ |

EXAMPLE 8 AND COMPARATIVE EXAMPLES 11 AND 12

The resin compositions in Example 2 and resin B and L used individually in Comparative Examples 2 and 4 were examined for melt viscosity at 300° C. with a shear stress of 1000 sec$^{-1}$ using a rheometer made by Rheometric Co., Ltd. The results are shown in Table 2.

TABLE 2

|  | Resin composition (parts by weight) | Melt viscosity (poise) at 300° C., 1000 sec$^{-1}$ |
|---|---|---|
| Comparative Example 11 | B (100) | 340 |
| Example 8 | | |
| a | B (70) L (30) | 220 |
| b | B (30) L (70) | 190 |
| Comparative Example 12 | L (100) | 180 |

The following are the processes for preparing the resins used in Examples.

<Resin A>

1081 parts by weight of 4-acetoxybenzoic acid, 489 parts by weight of 2,6-diacetoxynaphthalene, and 332 parts by weight of terephthalic acid were fed to a reactor provided with a stirrer, a nitrogen inlet tube, and a distillation tube. The mixture was heated to 250° C. under nitrogen stream and stirred vigorously at that temperature for 2 h and then at 280° C. for 2.5 h while acetic acid was distilled off from the reactor. The temperature was elevated to 320° C. and the feeding of nitrogen was stopped. The pressure in the reactor was reduced gradually to 0.2 mmHg after 30 min. The mixture was stirred at that temperature under that pressure for 1.5 h.

The resulting polymer had an intrinsic viscosity of 2.5 as determined in pentafluorophenol at a concentration of 0.1 wt% at 60° C. The polymer in the molten state exhibited optical anisotropism when observed between crossed nicols.

This polymer is composed of the following constituent units.

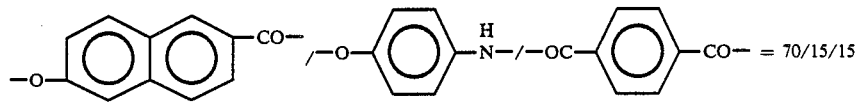

<RESIN B>

1261 parts by weight of 4-acetoxybenzoic acid and 691 parts by weight of 6-acetoxy-2-naphthoic acid were placed in a reactor provided with a stirrer, a nitrogen inlet tube, and a distillation tube. The mixture was heated to 250° C. under nitrogen stream and stirred vigorously at that temperature for 3 h and then at 280° C. for 2 h while acetic acid was distilld off from the reactor. The temperature was elevated to 320° C. and the feeding of nitrogen was stopped. The pressure in the reactor was reduced gradually to 0.1 mmHg after 20 min. The mixture was stirred at that temperature under that pressure for 1 h.

The resulting polymer had an intrinsic viscosity of 5.4 as determined in pentafluorophenol at a concentration of 0.1 wt% at 60° C. The polymer in the molten state exhibited optical anisotropism when obserbed between crossed nicols.

This polymer is composed of the following constituent units.

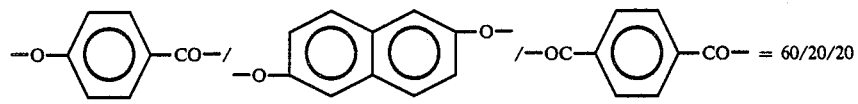

<RESIN C>

1612 parts by weight of 6-acetoxy-2-naphthoic acid, 290 parts by weight of 4-aetoxy-acetanilide, 249 parts by weight of terephthalic acid, and 0.4 parts by weight of sodium acetate were placed in a reactor provided with a stirrer, a nitrogen inlet tube, and a distillation tube. The mixture was heated to 250° C. under nitrogen stream and stirred vigorously at that temperature for 1 h and then at 300° C. for 3 h while acetic acid was distilled off from the reactor. The temperature was elevated to 340° C. and the feeding of nitrogen was stopped. The pressure in the reactor was reduced gradually to 0.2 mmHg after 30 min. The mixture was stirred at that temperature under that pressure for 30 min.

The resulting polymer had an intrinsic viscosity of 3.9 as determined in pentafluorophenol at a concentration of 0.1 wt% at 60° C. The polymer in the molten state exhibited optical anisotropism when observed between crossed nicols.

This polymer is composed of the following constituent units.

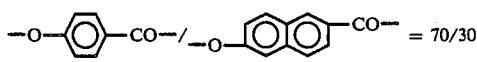

Resin L>

1248 parts by weight of acetoxybisphenol A, 166 parts by weight of terephthalic acid, and 498 parts by weight of isophthalic acid were placed in a reactor provided with a stirrer, a nitrogen inlet tube, and a distillation tube. The mixture was heated to 250° C. under nitrogen stream. The temperature was raised to 280° C. over 2 h. The reactants were vigorously stirred for 1 h. 736 parts by weight of 2-acetoxy-6-naphthoic acid and 864 parts by weight of p-acetoxybenzoic acid were added to the reaction system. The reactants were heated to 250° C., and the temperature was raised to 280° C. over 2 hours. The reactants were vigorously stirred for 2 hours. The temperature was further raised to 320° C. The feeding of nitrogen was stopped. The pressure in the reactor was reduced gradually to 0.2 mmHg after 30 min. The mixture was stirred at that temperature under that pressure for 1.5 h.

The resulting polymer had an intrinsic viscosity of 0.91, and it exhibited optical anisotropism in its molten state.

RESIN M>

768 parts by weight of polyethylene terephthalate having an intrinsic viscosity of 0.62 and 1080 parts by weight of p-acetoxybenzoic acid were placed in a reactor provided with a stirrer, a nitrogen inlet tube, and a distillation tube. The mixture was heated to 240° C. under nitrogen stream. The temperature was raised to 275° C. over 1 h. The reactants were vigorously stirred for 1 h. The feeding of nitrogen was stopped. The pressure in the reactor was reduced gradually to 0.4 mmHg after 30 min. The mixture was stirred for additional 4 h.

The resulting polymer had an intrinsic viscosity of 0.66, and it exhibited optical anisotropism in its molten state.

<RESIN N>

1024 parts by weight of polybutylene terephthalate having an intrinsic viscosity of 0.60, 720 parts by weight of p-acetoxybenzoic acid, and 460 parts by weight of 2-acetoxy-6-naphthoic acid were placed in a reactor provided with a stirrer, a nitrogen inlet tube, and a distillation tube. The mixture was heated to 250° C. under nitrogen stream. The temperature was raised to 275° C. over 1 h. The reactants were vigorously stirred for 1 h. The feeding of nitrogen was stopped. The pressure in the reactor was reduced gradually to 0.4 mmHg after 30 min. The mixture was stirred for additional 5 h.

The resulting polymer had an intrinsic viscosity of 0.73.

What is claimed is:

1. A resin composition which exhibits anisotropism when melted, comprising two components uniformly mixed with each other which following injection molding is capable of exhibiting a tensile strength and a flexural strength which exceeds that of each of the two components when separately injection molded, the first component being a resin which has no flexible skeleton and a rigid skeleton selected from the group consisting of polyester, polyesteramide, polyamide, polyazomethine, polyurethane, polysiloxane, and polyphosphazene, and mixtures of the foregoing, and exhibits anisotropism when melted, and the second component being a resin which has a rigid skeleton selected from the group consisting of polyester, polyesteramide, polyamide, polyazomethine, polyurethane, polysiloxane, and polyphosphazene, and mixtures of the foregoing, and a flexible skeleton selected from the group consisting of polyarylate, polyalkylene terephthalate, polycarbonate, polyethersulfone, polyacrylate, and mixtures of the foregoing.

2. A resin composition as set forth in claim 1, wherein the second component is a resin which exhibits anisotropism when melted.

3. A resin composition as set forth in claim 1, wherein the starting materials which constitute the rigid skeleton of the first and second components include at least one compound in common.

4. A resin composition as set forth in claim 1, wherein the rigid skeleton is composed of one or more kinds of compounds selected from polyester, polyesteramide, and polyamide, and the rigid skeleton per se is a segment which exhibits the properties of liquid crystal.

5. A resin composition as set forth in claim 1, wherein the rigid skeleton per se is composed of a polyester which exhibits the properties of liquid crystal.

6. A resin composition as set forth in claim 1, wherein the rigid skeleton is a segment composed mainly of one or more kinds selected from hydroxybenzoic acid residue, naphthalene residue, biphenyl residue, aminophenyl residue, terephthalic acid residue, andd hydroquinone residue.

7. A resin composition as set forth in claim 1, wherein the rigid skeleton is a segment composed mainly of hydroxybenzoic acid residue and/or naphthalene residue.

8. A resin composition as set forth in claim 1, wherein the first component is a polymer containing a naphthalene residue.

9. A resin composition as set forth in claim 8, wherein the naphthalene residue is a hydroxynaphthoic acid residue.

10. A resin composition as set forth in claim 9, wherein the hydroxynaphthoic acid residue is a 2-hydroxy-6-naphthoic acid residue.

11. A resin composition as set forth in claim 1, wherein the first component is composed mainly of a hydroxybenzoic acid residue and a hydroxynaphthoic acid residue.

12. A resin composition as set forth in claim 1, wherein the first component is a polymer composed mainly of a hydroxynaphthoic acid and an aminophenol residue.

13. A resin composition as set forth in claim 1, wherein the flexible skeleton of the second component is composed of polyalkylene terephthalate.

14. A resin composition as set forth in claim 13, wherein the alkylene in the polyalkylene terephthalate has 2 to 5 carbon atoms.

15. A resin composition as set forth in claim 1, which further comprises a third component which is a thermoplastic polymer.

16. A resin composition as set forth in claim 15, wherein the thermoplastic polymer is one or more kinds selected from the group consisting of non-crystalline aromatic polyester, polyalkylene terephthalate, polycarbonate, polyether sulfone, and polyacrylate.

17. A resin composition as set forth in claim 15, wherein the thermoplastic polymer is one or more polyester polymers selected from non-crystalline aromatic polyester and polyalkylene terephthalate.

18. A resin composition as set forth in claim 15, wherein the thermoplastic polymer is polyalkylene terephthalate.

19. A resin composition as set forth in any of claims 16 to 18, wherein the alkyl group of the polyalkylene terephthalate contains 2 to 5 carbon atoms.

20. A resin composition as set forth in claim 1, wherein the first component accounts for 95 to 5 wt% of the total weight and the second component accounts for 95 to 5 wt% of the total weight.

* * * * *